United States Patent [19]

Juffa et al.

[11] 4,228,815

[45] Oct. 21, 1980

[54] MEASUREMENT AND CONTROL OF MULTICOMPONENT LIQUID SYSTEMS

[75] Inventors: Richard Juffa, Cologne; Georg Wawra, Leverkusen; Walter Uerdingen, Schildgen, all of Fed. Rep. of Germany

[73] Assignee: Bayer Aktiengesellschaft, Leverkusen, Fed. Rep. of Germany

[21] Appl. No.: 868,648

[22] Filed: Jan. 11, 1978

Related U.S. Application Data

[63] Continuation of Ser. No. 696,153, Jun. 14, 1976, abandoned.

[30] Foreign Application Priority Data

Jun. 19, 1975 [DE] Fed. Rep. of Germany ....... 2527378

[51] Int. Cl.³ ........................................... G05D 11/13
[52] U.S. Cl. ........................................ 137/10; 137/98; 137/3; 73/204
[58] Field of Search ................ 73/194 E, 204; 137/10, 137/98, 101.19, 3

[56] References Cited

U.S. PATENT DOCUMENTS

| | | | |
|---|---|---|---|
| 1,849,335 | 3/1932 | Schmidt | 137/10 |
| 2,603,089 | 7/1952 | Morley et al. | 73/204 |
| 2,724,271 | 11/1955 | Shawhan et al. | 73/204 |
| 3,036,585 | 5/1962 | Shawhan | 137/101.19 |
| 3,229,077 | 1/1966 | Gross | 137/101.19 |
| 3,506,460 | 4/1970 | Bayne | 137/101.19 |
| 3,807,228 | 4/1974 | Matzuk | 73/204 |
| 3,820,393 | 6/1974 | McGunigle | 73/204 |
| 3,922,912 | 12/1975 | Bradbury et al. | 73/204 |

*Primary Examiner*—William R. Cline
*Assistant Examiner*—H. Jay Spiegel
*Attorney, Agent, or Firm*—Gene Harsh; Lawrence S. Pope

[57] ABSTRACT

The method is based on the fact that the particular components are conveyed through separate pipes into a mixing chamber. By measuring the transit time in at least one of the pipes the flowrate can be measured. The flow in the other pipes which is in a fixed ratio to the first flow is then adjusted automatically. For measuring the transit time a heat pulse is injected in at least one of the pipes and the transit time of the heat impulse is measured. The so-measured transit time is converted into an inversely proportional voltage and the flowrate in the other pipes is adjusted proportionally to this voltage. An apparatus is provided for practicing the method. The apparatus comprises flow measuring elements which are electrical connected to control devices which operate flow control devices in the pipes leading to the mixing chamber.

11 Claims, 4 Drawing Figures

MEASUREMENT AND CONTROL OF MULTICOMPONENT LIQUID SYSTEMS

This is a continuation, of application Ser. No. 696,153 filed June 14, 1976, now abandoned.

FIELD OF THE INVENTION

The invention relates to a method and apparatus for the dosing of multicomponent liquid systems, in which the components are fed into a mixing chamber by means of dosing devices through separate pipes and subsequently further processed. In particular, the invention relates to the dosing of two component systems comprising chemically reactive liquids.

BACKGROUND OF THE INVENTION

Liquid two component systems, e.g. those based on epoxy resins or polyurethanes are used for the production of plastics, e.g. foams, elastomers or coating substances. Two component lacquer systems have in recent years gained over increasing importance. They are used more and more, in particular in the motor industry. The reason for this lies in the superior qualities of such two component lacquer systems. However, their quality can only be maintained if the components are dosed with great accuracy. The lacquer spraying technique most used in mass production requires continuous dosing, and once adjusted, the dosing rate for the system in question must always remain constant. Dosing fluctuations can lead to serious losses of quality, e.g. color stability or weather resistance.

The two component dosing apparatus known and used hitherto does not meet these requirements. All pressure supplying pumps are susceptible to faults when used with abrasive and sediment-forming materials. Moving parts wear and lose their tightness, thus altering the preset quantity ratio.

The simplest method of dosing a liquid by the application of a constant over-pressure to a liquid in a container does not work with two component installations. It has been found that in mixing process pressure fluctuations take place in the mixing chamber, affecting the quantity flowing into the mixing chamber. In addition, pressure and thus flowrate fluctuations can occur in all pipes through leakage and changes of viscosity, which exceed the permissible tolerance of the quantity ratio.

The object of the invention is to provide a dosing method for multicomponent liquid systems, which permits an accurate and reproducible dosing independent of pump pressure, density, viscosity and temperature of the components. This concerns predominantly low output rates (50 to 200 $cm^3$/min per component) which, for example, are usual in spray lacquering and coating. The reproducibility of the dosing should not be affected by liquid components containing abrasive pigments.

SUMMARY OF THE INVENTION

According to the invention, there is provided a method for dosing multicomponent liquid systems into a mixing chamber, in which the components are conveyed through separate pipes to the mixing chamber, wherein at least one of the pipes, at a first point in the pipe a heat impulse is produced in the liquid flowing in the pipe, at one or more other points in the pipe downstream of the first point the heat impulse is detected and the time taken for the heat impulse to reach at least one of the other points is measured, the measured transit time then is converted into a voltage which is proportional to the flow-rate of the liquid in said pipe and the flowrate in the other pipes is controlled proportionally to this voltage.

According to a preferred embodiment the heat impulse is detected at only one point in the pipe downstream of the first point. The transit time is then measured taken for the heat impulse to travel the distance between the first point where the heat impulse is produced and the second point where the heat impulse is detected.

Alternatively the heat impulse is detected sequentially at a series of points in the pipe downstream of the first point. In this case the transit time taken for the heat impulse to travel the distance between at least two consecutive points downstream of the first point is measured. The response time of measurement and thus the recovery time of the control device can be improved when the transit time is measured successively between more than two consecutive other points downstream in the pipe.

In the field of lacquer coating the lacquer components are frequently not continuously but intermittently conveyed; f.i. when a manually operated spraying gun is used. Pursuant to the present invention and in consideration of this object the heat impulse is injected into the pipe at the first point substantially at each moment of restoring the flow of the components.

It has been found that the accuracy of transit time measurement can be improved when the transit time is determined by measuring the time lag at the moment where the ascending or descending flank of the heat impulse appears at the first point and the moment where the ascending flank of the heat impulse arrives at the second point. Thus at the first point it is not critical which flank of the heat impulse is used for measurement whereas at the second point the steep temperature increase at the ascending flank, i.e. the front flank of the heat impulse is to be detected and used for further signal processing. It is evident that this embodiment may also be extended to the previously described method where the travelling heat impulse is detected at more than one point downstream of the first point. This means that the transit time is determined by measuring the time lag at the moments where the ascending flank of the heat impulse appears at two different other points downstream of said first point.

It is advantageous if the transit time measurement is effected periodically by periodically injecting a heat impulse at said first point.

For the purpose of providing a continuous signal for the control member it has been proven successful to store electrically the instantaneous flowrate obtained from a measurement of transit time of an individual heat impulse until the measurement of transit time is effected with the following heat impulse. In particular the storage of measurement is helpful when the components are periodically conveyed. In this case the value of the last measured flowrate is electrically stored and the flowrate in the other pipes is controlled in the following period of conveyance with this measurement result until a subsequent measurement of flowrate is taken.

In one embodiment of the invention the transit time is digitally measured in at least one pipe by supplying impulses at a constant pulse frequency to an impulse counter for the period where the heat impulse travels from the first point to one of the other points or the distance between two successive other points. The counter content is then converted into a digitally quantity in the binary code which is proportional to the flowrate and thereafter reconverted into an analogous signal for actuating control means in the other pipes.

If the method according to the invention is applied to a two component system, the transit time measurement takes place in one pipe leading to the mixing chamber, while the flowrate in the other pipe is adjusted accordingly. The two flowrates are then always in a fixed ratio to one another independent of the absolute throughput.

A further modification of the invention comprises injecting periodically heat impulses and triggering a new heat impulse at the first point when the heat impulse is detected at the second point. The resulting impulse frequency can then be used as a measure of the flowrate.

According to the invention there is also provided an apparatus for carrying out the method, comprising a mixing chamber, a plurality of pipes connected to the mixing chamber, in each of which is arranged an electrically activated dosing device, a heating wire arranged in at least one of the pipes and downstream of the heating wire a thermoelectric heat sensor, the heat sensor being electrically connected to an amplifier and a voltage comparator, means for producing periodic heat impulses by passing a current through the heating wire, an electric pulse generator supplying pulses into a counter during the transit time, where a heat impulse travels from the heating wire to the thermoelectric sensor, a storing unit for storing the counter content until the next following heat impulse reaches the thermoelectric sensor, a code converter for converting the counter content into a quantity in the binary code, which is proportional to the flowrate, a digital analog converter for reconverting this quantity into an analogous signal and amplifier means for amplifying the analogous signal, being connected to electrically activated dosing devices in the other pipes, the dosing rate of which is proportional to the voltage applied.

Preferrably the apparatus is provided with a heating wire having a weight of less than 15 mg and means for periodically discharging a condensor through the heating wire within a few milliseconds. By the way heat impulses are produced within the range from 5 to 100 ms. In practise the distance between the heating wire and the thermoelectric heat sensor may be within the range from 5 to 500 mm.

As a thermoelectric heat sensor a differential thermocouple has been proven particularly successful.

Investigations of lacquer flow conditions have shown that the reciprocal of the flow-rate and the transit time are not always proportional to each other but are correlated by a non linear function. To resolve this difficulty the code converter in the apparatus is programmed to account for the particular function between the flowrate and the transit time to yield finally a quantity which is proportional to the flowrate.

DETAILED DESCRIPTION OF THE INVENTION

The transit time measurement section is advantageously designed so that the impulse duration of the heat impulse is from 1 to 100 ms and the distance between the heating wire and the heat sensor is in the range of from 5 to 500 mm.

An important advantage of the method according to the invention is that precisely working dosing pumps are not required. Such pumps are generally very susceptible to faults.

Figure 1:
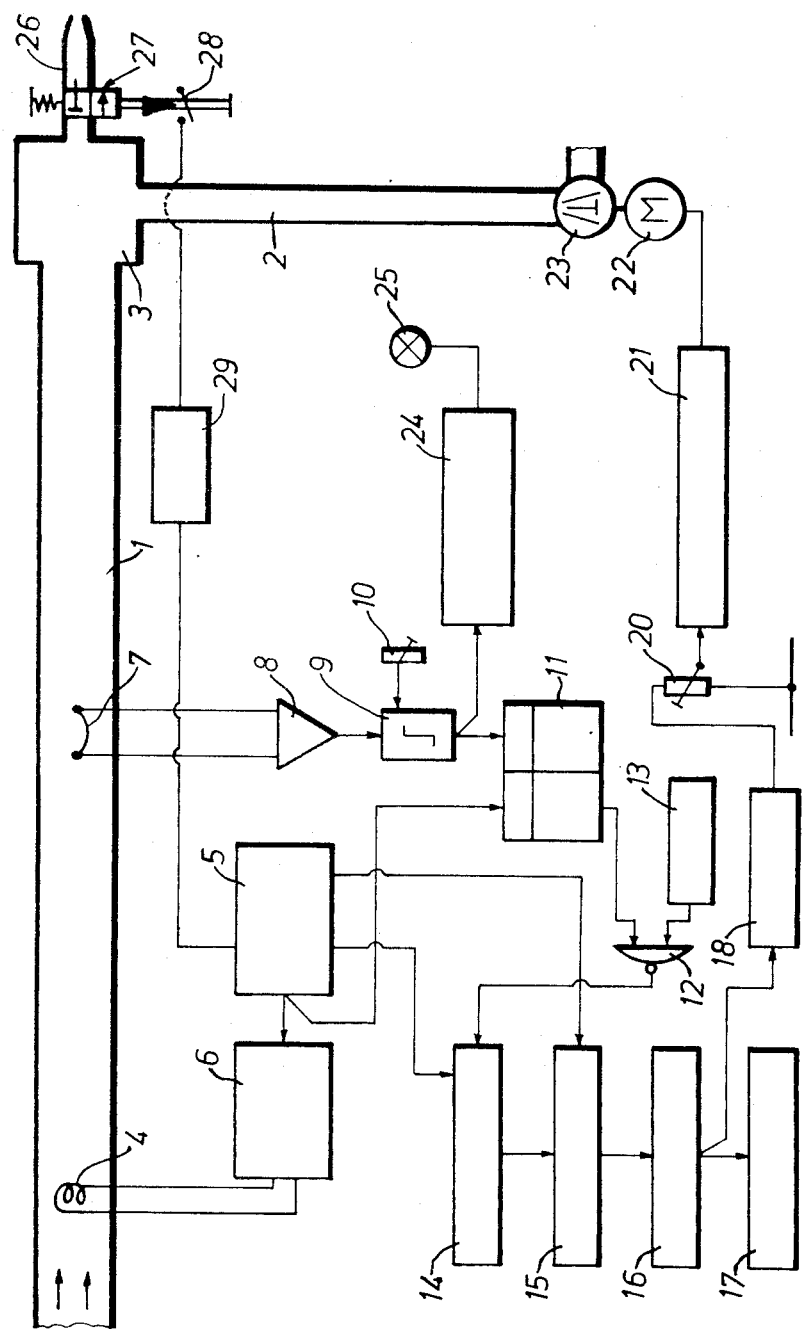
FIG. 1 is a schematic representation of a two component control system, which is a preferred embodiment of the present invention.
Figure 2:
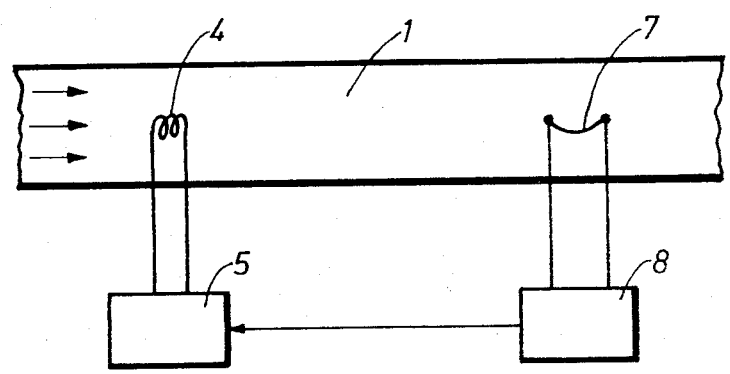
FIG. 2 is a schematic representation of a particular embodiment of sensing the flow in a pipe.

Moreover the flow rate regulation according to the invention works without moving parts and is independent of the pressure, the optical transparency, the electrical conductivity and the viscosity of the components. Very low flowrates can also be dosed, since the dead volume of the measuring device is very low. Because of its small structural volume, the transit time measuring section and thus the regulation device can be fitted to hand operated mixing heads. The simple construction provides for trouble free exchange and cleaning. In the accompanying drawings:

FIG. 1 shows a schematic diagram of an apparatus for the regulated dosing of a two component mixture using the principle of transit time measurement; and FIG. 2 shows a modified transit time measurement section with feedback coupling of the heat sensor to the heat impulse transmitter.

In FIG. 1 a first component, e.g. a solution of a polyester resin containing hydroxyl groups with a 60% solids content, is conveyed through pipe 1 and a second component, e.g. a polyisocyanate based hardener, is conveyed through a second pipe 2 into a mixing chamber 3. The mixing chamber 3 is directly connected to a spray gun. The components are conveyed by the application of an air or nitrogen over-pressure in an enclosed storage tank or out of ring pipes as is customary in the motor industry.

The ratio of the flowrates of the two components must always be kept constant to assure a uniform quality of the lacquering. To measure and regulate the quantity flow ratio a platinum heating wire of 0,25 mm diameter in the form of a coil having 5 turns with a diameter of 2 mm, is incorporated in the center of the pipe 1. This heater is heated up within a few milliseconds periodically or aperiodically by current impulses generated by discharging a condensor via the heating wire. Typical data for the platinum wire are: Resistance 1,5 Ohm, weight 10 mg, pulse voltage 5 volts, pulse duration 50 ms. The discharge of the condensor is controlled via a transistor switch by the power amplifier 6 which is fed by an impulse generator 5 (tact generator). The heat pulse produced in this manner, is imparted to the central portion of the streaming liquid. This portion is then carried along with the flow as a heat plug. The heat plug after travelling for the period of the transit time T, reaches the thermoelectric heat sensor 7 incorporated in the center of the flow. The transit time T is directly proportional to the distance between the heater and the thermoelectric sensor 7 and inversely proportional to the streaming velocity and thus the flowrate. In a preferred embodiment the distance between heater and sensor is in the range of 40–50 mm; however this distance may be varied for obtaining a higher accuracy or shorter measuring time. The heat sensor 7 is a differential thermocouple element with a very low response time, which ensures that slow changes in the basic temperature of the liquid have no effect on the measurement. The temperature rise as the heat plug flows past is recorded substantially without delay.

When using a device with the previously indicated data, the maximum temperature at the differential thermocouple is reached within 20–100 ms depending on the streaming velocity.

The voltage produced at the differential couple element 7 is amplified by a chopper amplifier 8 with an amplification $>10^4$ so that a temperature increase of 1° C. at the differential thermocouple is already sufficient to activate the threshold comparator 9. The threshold value of the comparator 9 is adjusted to such a low voltage that the steep temperature increase at the ascending flank of the received thermopulse at the thermocouple activates the comparator almost immediately to switch. It has been surprisingly found that a more precise measurement of transit time can be obtained when using the ascending flank, i.e. the front flank of the thermoimpulse to excite the comparator 9.

The transit time of the heat plug is now digitally determined. Simultaneously with the current impulse through the heating wire 4, a bistable multivibrator 11 is set and is reset on receipt of the signal from the comparator 9. The period during which the bistable monovibrator 11 is set, corresponds to the transit time of the heat plug through the pipe 1 and is inversely proportional to the flowrate of the component in the pipe.

The measurement of the transit time is performed in the following manner. During the set time of the multivibrator 11 pulses from an impulse generator 12 are fed into an impulse counter 14 through a gate switch 12. The counter 14 is each time set to zero by a signal supplied from the tact frequency generator 5 at the time of producing a new heat pulse. The pulses previously counted during a measuring cycle are temporarily stored in a digital store 15 until the next measuring cycle. This storing is necessary to deliver to the circuit an uninterrupted signal for controlling the dosing pump 23. Storing of the counter content is also of particular importance when the components in the pipes are not continuously but periodically conveyed (cycling on-off operation). The value of the last measured flowrate is then stored in another digital storing unit (not shown) and the flowrate in the other pipes is controlled in the following period of conveyance on the basis of the stored value until a subsequent measurement of flowrate is taken.

To convert the transit times measured into flowrates a permanently programmed ROM-code converter 16 is used ("read only memory"). The counter content of the pulse counter 14 indicates for every measuring cycle the address from which the flowrate may be read from the ROM-element. Address and flow quantity are correlated previously by reading the program into the ROM. Normally the flowrate is inversely proportional to the address. However by modifying the program of the ROM, corrections resulting from the particular flow profile can be taken into account. Such corrections are for instance necessary in the case of liquids showing structural viscosities (non Newtonian liquids). The reciprocal of the flowrate and the transit time are then no longer correlated by the usual linear function. It is however possible by appropriately programming the ROM to obtain a correct flowrate measurement even under these unusual circumstances. Also corrections may be employed for compensating non linear effects of the dosing pump 23.

For direct digital indication of the flowrate in pipe 1 the output of the code converter 16 is connected to a numerical indicator unit 17. For analogue indication and to obtain a signal for control purposes the digital output signal of the code converter 16 is converted by a digital analogue converter 18 into an analogue voltage. This voltage is passed through a voltage divider 20, by means of which the desired ratio between the flowrate of the liquid in the first pipe 1 and the flowrate to be regulated in the second pipe 2 is preselected. The regulation of the second component takes place by feeding the nominal value of the voltage coming from the voltage divider 20 to a proportional power amplifier 21, which supplies the drive motor 22 for a dosing pump 23 in pipe 2. Instead of a dosing pump, a motor-driven regulator valve or aperture can also be used.

If the device is operated with periodic heat pulses the function of the device is monitored by a retriggerable monovibrator 24. If the liquid is streaming, voltage pulses corresponding to the heating cycles must arrive at the comparator 9. These voltage pulses are setting continuously the retriggerable monovibrator 24. In the event of interruption of the impulse sequence (e.g. caused by a defect in the heating wire 4, the thermocouple element 7, impulse amplifier 8, or by a flow stoppage) an alarm device 25 is activated. If the flow is stopped by intention, e.g. in the case of intermittently lacquer spraying, the monitoring unit 24 is disconnected for the time of interruption. When operating the device intermittently the outlet nozzle 26 of the mixing chamber 3 is provided with a shutting valve 27 which controls a switch 28, being connected to the pulse generator 5. By a switch 28 the impulse generator 5 is then energized and activated in such a manner that almost simultaneously at the moment of restoring the flow in pipe 1 by opening the valve 27 the pulse generator 5 is started to impart a thermoimpulse via power amplifier 6 and heating wire 4 to the steaming liquid in pipe 1. It has been observed in this connection that the measurement of transit time may be obscured by an unstable flow pattern just after restoring the flow by opening the valve 27. Therefore an adjustable delay unit 29 is introduced in the line between the mechanical switch 28 and the impulse generator 5. The delay is adjusted to such a value (in the order of a few milliseconds) that the first thermoimpulse is not till then injected when the irregular flow has been disappeared and steady state conditions are prevailing again in pipe 1. It has been found that the period of restoring the steady state conditions is usually very short, i.e. in the order of a few milliseconds.

According to a modified embodiment of the invention a series of differential thermocouples 7 is arranged within the pipe 1 downstream of the heating wire 4. The thermoimpulse then passes sequentially the series of thermocouples, producing successive electric pulses. With this device a shorter response time and higher accuracy of transit time measurement can be obtained which is however counterbalanced a more complex and expensive measuring device. The transit time of the thermoimpulse is then measured between two successive thermocouples in pipe 1. The distances between the sensors may be very small (i.e. in the order of 1 cm), since only the passage of the steep flank of the heat pulse is used for signal processing. The measurement is carried out with an electronic circuit which is very similar to that which has already been described. When the thermoimpulse passes the first thermocouple, pulses are counted at a constant rate into counter 14 until the thermoimpulse arrives at the second thermocouple. Signal processing is then performed in the same manner as described above in connection with FIG. 1. This embodiment is particular useful e.g. with lacquer spraying in the automotive industry when the dosing device is operated for very short periods (<1 s) and more than one flow measurement is required within said period of operation. When using more than two thermocouples and taking successive measuring values for the transit time along the series of thermocouples, a multiplexer may be used to switch the input of the circuit (preamplifier 8) to successive thermocouples in pipe 1.

In one embodiment of the control circuit instead of the analogue quantity regulation, direct digital regulation is implemented. For this purpose a frequency proportional control motor (e.g. stepping motor) is used to drive the dosing pump 23, being fed directly with the amplified digital output signal of the code converter 16.

A variant of the regulation device according to the invention for a two component system involves incorporating a transit time measurement section in both pipes and regulating the flowrate in both pipes. With this embodiment not only the quantity ratio of the components but also the absolute quantity of the finished mixture can be maintained constant.

A further possibility of signal processing is schematically shown in FIG. 2. The voltage impulse generated by the heat plug is here used to trigger a new heat impulse in the impulse generator 5; i.e. each heat plug arriving at the thermocouple element 7 immediately triggers off a new heat impulse at the heating wire 4. The resultant impulse frequency is directly proportional to the flowrate in the pipe 1. It can be used in a similar manner, as already described in the first embodiment, for the regulation of the second component.

Figure 3:
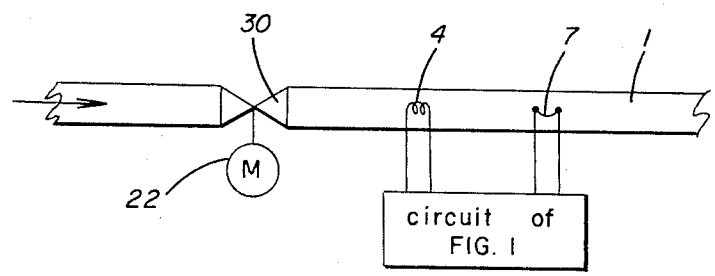
FIG. 3 is a schematic representation of the embodiment of FIG. 1 wherein an electrically activated dosing device is in the same conduit as the heating wire and thermoelectric heat sensor.
Figure 4:
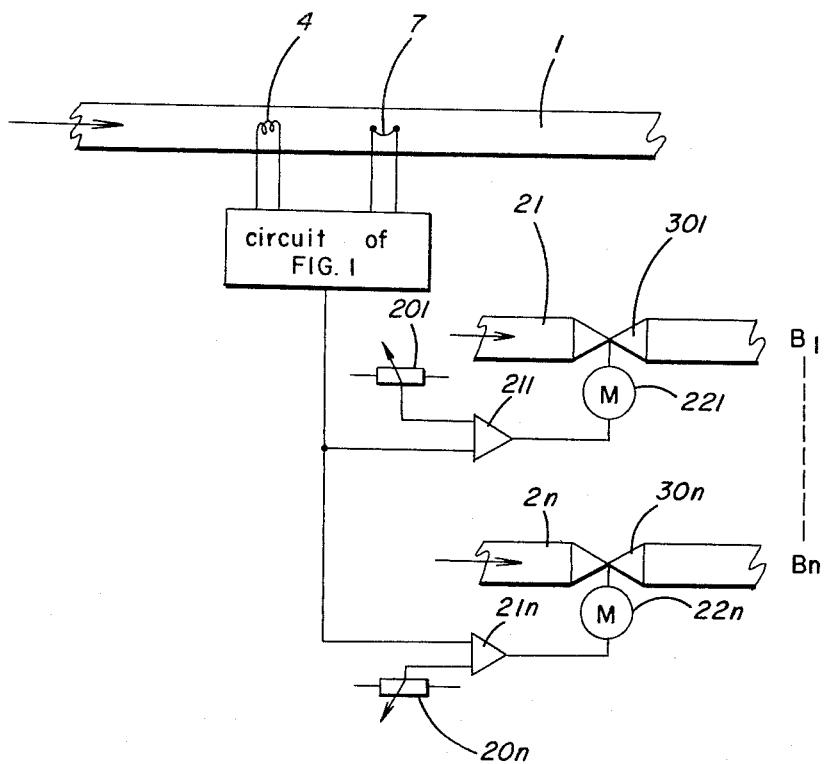
FIG. 4 is a schematic representation of a system wherein the flow in a plurality of pipes is controlled in response to the flow in the monitored pipe.

The conduit 1 in which the heating wire 4 and the thermoelectric heat sensor 7 are placed may also contain an electrically activated dosing device such as the control motor 22 and the regulating valve 30 which it controls as shown in FIG. 3.

The control signal generated from the circuit of FIG. 1 including the heating wire 4 and the thermoelectric heat sensor 7 in conduit 1 for component A may be used to control the flow in a plurality of conduits such as $2l$ to $2n$ for components $B_l$ to $B_n$ as shown in FIG. 3. This output is fed to the power amplifiers $21l$ and $21n$ for the respective conduits $2l$ to $2n$. The amplifiers supply signals to their respective control motors $22l$ to $22n$ which in turn control their respective regulating valves or conveying pumps $30l$ to $30n$. The power amplifiers are provided with potentiometers $20l$ to $20n$ to control the ratio of flow in their respective pipes to the flow in the measuring conduit 1 in the same manner as the voltage divider or potentiometer 20 in FIG. 1.

With the arrangement described with reference to FIG. 1, two component polyurethane lacquers were produced and processed ready for spraying. One component contained a polyester solution with pigments and abrasive additives (e.g. pigments containing $SiO_2$), while the other component consisted of a hardener solution comprising polyisocyanates. The dosing of such mixtures is normally difficult on account of corrosion at the measuring and dosing elements. No indication of corrosion was observed on the transit time measuring section even after a long period of operation. It is significant that the measuring element has no moving parts. For cleaning purposes it can be easily installed and removed. Because of the measurement principle, the viscosity—in contrast with most other measuring methods for flowrate—is not included in the measurement. According to the invention no difficulties occur in the dosing of liquids having a viscosity of from 50 to 2000 cP and flowrates of from 20 to 1000 $cm^3$/min per component.

The method according to the invention was also tested in the production of polyurethane foams. For this purpose a reaction mixture of diisocyanates, polyols and water together with emulsifiers, dispersion agents and catalysts was produced (see Kunststoff-Handbuch, Vol. 7, Polyurethane, Karl Hanser Verlag Munchen 1966, pages 144–149). For the production of polyurethane foams, as the first main component polyhydroxyl compounds having at least two hydroxyl groups of a molecular weight of from 62 to 10,000, preferably 62 to 5000 are used; e.g. polyesters, polyethers, polythioethers, polyacetals, polycarbonates, polyester amides having at least 2, usually from 2–8, preferably, however, 2 hydroxyl groups. The second main component should preferably consist of aliphatic, cycloaliphatic, araliphatic and aromatic polyisocyanates. In particular the technically easily obtainable polyisocyanates are used e.g. the 2,4- and 2,6-toluylene diisocyanates and any mixtures of these isomers and polyphenyl polymethane polyisocyanates. The components must be very accurately dosed. For this purpose the above described regulation system according to the principle of transit time measurement has proved very effective.

Although the invention has been described in detail for the purpose of illustration, it is to be understood that variations can be made therein by those skilled in the art without departing from the spirit and scope of the invention except as it may be limited by the claims.

What is claimed is:

1. An apparatus for dosing multicomponent liquid systems, comprising a mixing chamber, a plurality of pipes connected to the mixing chamber, in at least all but one of which is arranged on electrically activated dosing device, a heating wire arranged in at least the optionally dosing device free pipe and downstream of the heating wire a thermoelectric heat sensor, the heat sensor being electrically connected to an amplifier and a voltage comparator, means for producing periodic heat impulses by passing a current through the heating wire, an electric pulse generator supplying pulses into a counter during the transit time where a heat impulse travels from the heating wire to the thermoelectric sensor, a storing unit for storing the counter content until the next following heat impulse reaches the thermoelectric sensor, a code converter for converting the counter content into a quantity in the binary code which is proportional to the flow rate, a digital-analog converter for reconverting this quantity into an analogous signal and amplifier means for amplifying the analogous signal, being connected to electrically activated dosing devices in the other pipes, the dosing rate of which is proportional to the voltage applied.

2. An apparatus according to claim 1, comprising a heating wire having a weight of less than 15 mg and means for periodically discharging a condensor through the heating wire within a few milliseconds.

3. An apparatus according to claim 1, wherein the heat sensor is a differential thermocouple.

4. An apparatus according to claim 1, wherein the code converter is programmed to yield a quantity which is proportional to the flowrate, when the reciprocal of the flowrate and the transit time are correlated by a non linear function.

5. An apparatus according to claim 1, wherein the dosing device comprises a pressure pump.

6. An apparatus according to claim 1, wherein the dosing device comprises an electrically activated regulating valve.

7. An apparatus according to claim 1, wherein the distance between the heating wire and the thermoelectric heat sensor is from 5 to 500 mm.

8. An apparatus for dosing multicomponent liquid systems, comprising a mixing chamber, at least all but one of the conduits of all which are provided with dosing devices, characterized in that at least one of the conduits to the mixing chamber is provided with a transit time measuring unit to determine the flowrate, comprising a heater which is centrally mounted in the conduit and downstream in this conduit a thermoelectric sensor, being connected via an amplifier and a comparator with the reset input of a bistable multivibrator, the multivibrator activating during its set time a gate for the transit time of a heat plug generated by said heater to receive pulses from an impulse generator and the counted pulses in a counter are summed up and stored in a digital counter which is connected to an electric codeconverter and digital to analog converter, which produces an electric signal proportional to the flowrate, said signal being amplified in a power amplifier and the power amplifier being connected to an electrically activated dosing device in each other conduit, the dosing rate of which is proportional to the applied voltage.

9. An apparatus for dosing multicomponent liquid systems comprising:
   (a) a mixing chamber with feed conduits, at least all but one of which are provided with dosing devices,
   (b) a transit time measuring unit comprising
      (1) a heater which is centrally mounted in the optionally dosing device free conduit and is connected to a power source,
      (2) a thermoelectric sensor mounted in said conduit between said heater and the mixing chamber, and connected to an amplifier which is connected to a comparator,
      (3) a bistable multivibrator whose set input is connected to said heater power source and whose reset input is connected to said comparator,
      (4) a gate connected to said multivibrator so as to pass pulses from a pulse generator to an impulse counter only when said multivibrator is in its set mode,
      (5) a digital store connected to said counter which stores the sums in said counter and connected to said digital store,
   (c) a control means comprising
      (1) an electronic code converter and a digital analogue converter which in combination convert said stored value into an electric signal which is proportional to the flowrate of a liquid medium in said conduit,
      (2) a power amplifier which is adapted to amplify said electric signal and is connected to
      (3) a control means in each dosing device which controls the dosing rate proportional to the signal received from said power amplifier.

10. An apparatus for dosing multicomponent liquid systems comprising:
   (a) a mixing chamber with feed conduits, at least all but one of which are provided with dosing devices,
   (b) a transit time measuring unit comprising
      (1) a heater which is centrally mounted in the optionally dosing device free conduit and is connected to a power source,
      (2) a thermoelectric sensor mounted in said conduit between said heater and the mixing chamber and connected to
      (3) an amplifier which is connected to
      (4) a comparator,
      (5) a bistable multivibrator whose set input is connected to said heater power source and whose reset is connected to said comparator,
      (6) a gate connected to said multivibrator so as to pass pulses from a pulse generator to an impulse counter only when said multivibrator is in a set mode,
      (7) a digital store which retains the sum accumulated in said impulse counter from one set reset cycle of said multivibrator until the next cycle is completed, and
      (8) an electronic code converter which converts the sum in the digital store into a quantity directly proportional to the flowrate of a liquid medium in said conduit, and
   (c) a control means comprising
      (1) a digital analogue converter which converts said quantity into an electrical signal,
      (2) a power amplifier which amplifies this signal, and
      (3) a control means in each dosing device which controls the dosing rate proportional to said signal.

11. A method for dosing multicomponent liquid systems in which the liquids have viscosities between about 50 and 2000 cP; the flowrate is between about 50 and 100 cm$^3$/minute; and the components are conveyed by separate conduits into a mixing chamber comprising:
   (A) injecting a thermopulse of between about 5 and 100 ms in duration into the liquid flowing in one of said conduits by means of a heater centrally mounted in the conduit carrying said liquid,
   (B) simultaneously adjusting a bistable multivibrator to its set mode so that it allows pulses from a pulse generator to pass through a gate to a pulse counter,
   (C) activating said pulse generator for at least one measurement cycle,
   (D) detecting the arrival of the ascending flank of said pulse with a thermoelectric sensor mounted in said conduit between about 5 and 500 mm downstream of said heater,
   (E) amplifying the detection signal of said sensor and passing it to a comparator,
   (F) using said amplified signal to activate said comparator and using the output of said comparator to activate the reset mode of said bistable multivibrator thereby closing said gate to further pulses of said pulse generator,
   (G) converting the value accumulated in said pulse counter during the set/reset cycle of the multivibrator to a value equivalent to the velocity of said liquid by means of a permanently programmed ROM-code converter, and
   (H) storing the value accumulated in said impulse counter until the next set/reset cycle of the multivibrator is completed,
   (I) using the value equivalent to the velocity of said liquid to generate a voltage which is used to control the flowrates in the other conduits.

* * * * *